3,035,005
METHOD FOR PREPARING A CORROSION INHIBITING RESINOUS COATING COMPOSITION
Lorne G. Sampson, Skokie, Ill., assignor, by mesne assignments, to Mystik Adhesive Products, Inc., a corporation of Illinois
No Drawing. Filed Jan. 6, 1956, Ser. No. 557,629
11 Claims. (Cl. 260—31.8)

This invention relates to the protection of metal surfaces against corrosion or rusting and it relates more particularly to an improvement in the formulation and preparation of a composition containing a rust or corrosion inhibitor in combination with a film-forming material for application to provide a thin film on the surfaces of metals such as iron or steel to protect the surfaces against physical harm and against corrosion or rusting.

While the invention will be described hereinafter with particular reference to the use of alkali metal nitrites, such as sodium nitrite or potassium nitrite as the compound for inhibiting corrosion and rusting, it will be understood that the techniques described and claimed herein can be employed in the preparation of similar coating compositions with other compounds for inhibiting rusting and corrosion, such as organic nitrites, phosphates, chromates and the like.

Sodium nitrite has received considerable recognition as an agent for the prevention of rust and corrosion on iron and steel and for such other metals as aluminum, tin, Monel, copper and brass. It has been found that the metal nitrite is effective to prevent rust and corrosion without application directly to the metal surfaces. Thus, effective protection can be secured by the incorporation of the nitrite in a coating applied to provide a protective film on the metal surface.

In the formulation of coating compositions containing sodium nitrite, it has been the practice to incorporate the nitrite as an ingredient with the pigment, when present, by milling the nitrite into the carrier as by means of a ball mill, roller mill and the like. The milling operation not only represents a considerable proportion of the cost of preparing the coating composition, but it requires considerable work satisfactorily to distribute the nitrite in the viscous composition. In any event, the particles of nitrite which remain in the composition after the milling operation have been found to be of substantial dimension by comparison with the particle size of the nitrite which results from the practice of the concepts of this invention. As a result, for effective controlling it has been necessary to make use of coating compositions containing nitrites in amounts greater than 5% by weight of the dry film that is formed or greater than 5% by weight based upon the solids content of the composition.

It is an object of this invention to produce and to provide a method for producing a coating composition of the type described containing a material for preventing rust and corrosion.

More specifically, it is an object of this invention to produce and to provide a method for producing a coating composition containing a material for preventing rust and corrosion uniformly distributed therein without the necessity of employing a milling operation to effect distribution of the compound, and without having to work the compound into the carrier for distribution and suspension of the particles therein.

A further object is to produce and to provide a method for producing a coating composition of the type described in which the compound for preventing rust and corrosion is present in uniform distribution in the form of particles of considerably smaller dimension than can be made available by milling, thereby to provide for greater protection with lesser amounts of material in the coating composition or film that is formed thereof.

Briefly described, the basic concepts of this invention reside in the formulation of a solution for the agent for preventing rust and corrosion in a solvent medium which is compatible with the medium in which the film-forming material is dissolved to form a system upon combination in which the compound for preventing corrosion or rusting is not soluble in the concentration in which it is present, with the result that the compound for resisting corrosion and rusting precipitates from solution as a colloidal dispersion of freshly formed or nascent particles as the one system is mixed with the other to form the treating composition. As a result, the particles which form in a nascent condition are of a size incapable of being achieved by any system which relies upon physical breakdown, and the particles that are formed by precipitation upon a mixture of the systems described become automatically distributed throughout the coating composition in a manner incapable of being achieved by any amount of milling or mechanical working. It is believed that the colloidal character of the particles, coupled with their inability to separate or depart from their natural distribution achieved by precipitation in situ in the system, is responsible for the improvement in protection which is secured against corrosion or rusting with a marked decrease in the concentration of the agent in the coating composition or film that is formed.

The development of these basic concepts relies on the existence of certain conditions. The compound for resisting corrosion or rusting must be capable of solution in a solvent system in a concentration greater than desired in the final product. The solvent system in which the compound is dissolved must be capable of combination with another solvent system in which it is miscible or compatible to form a stable composite system in which the compound for resisting corrosion or rusting is incapable of remaining in solution, at least in the concentration in which it is present. Combination of the solution of the corrosion or rust inhibiting compound with the other system should be made with stirring substantially immediately to precipitate the compound and prevent the build-up of crystals of large dimension and to achieve uniform distribution of the crystals whereby particles of substantially colloidal dimension are formed, which particles are capable of remaining suspended in the system, even in the absence of a film former. The composite system, while incapable of maintaining the compound for resisting corrosion or rusting in solution, should be capable of providing a stable system or solution of the film-forming material in the preparation of the coating composition wherein the substantially colloidal particles of the agent for resisting corrosion or rusting are substantially permanently suspended. Thus the protective coating which is applied to the metal surface is capable of forming a film upon drying in which the agent or compound for resisting corrosion or rusting is more uniformly distributed as finer particles in a state which appears to be more reactive than available in films provided of the same materials formulated by processes heretofore employed.

With these basic concepts and conditions, it becomes possible to formulate and prepare improved protective coating compositions with various types of agents for resisting corrosion and rusting, and with various types of film-forming materials merely by the proper selection of solvents, and it is the intention of applicant to include such other systems in combination within the scope of this invention.

The following will provide illustrations of the applications of these concepts to the formulation of a protective coating.

Example I

Coating composition:
- 0.05 parts by weight sodium nitrite
- 1.2 parts by weight methanol
- 42 parts by weight methyl ethyl ketone
- 7 parts by weight methyl isobutyl ketone
- 20 parts by weight xylene
- 20 parts by weight polyvinyl chloride VMCH resin
- 10 parts by weight dioctylphthalate plasticizer Procedure: The sodium nitrite is dissolved in the methanol and solution is added with mixing to a solvent system formed of the methyl ethyl ketone, methyl isobutyl ketone, and xylene. The methanol will be miscible with the solvents to form a stable system but the resulting solvent system will be incapable of serving as a solvent for the sodium nitrite. As a result, the sodium nitrite will precipitate as a fine cloud wherein the agitation of the materials upon addition of one system to the other will cause the dispersion of the precipitated particles of sodium nitrite substantially immediately in the system.

With continued agitation, the polyvinyl chloride, in powder form, is added to effect the solution of the film-forming polymer in the solvent system. With the solution of the polyvinyl chloride, the viscosity of the composition increases and the sodium nitrite particles tend to become fixed into the colloid or gel which is formed. To this mixture, the plasticizer is added with the small amount of pigments or other plasticizers, as desired.

The resulting product is a composition in the form of a stable solution which may be used to deposit a film on a metal surface. The film embodies all of the properties of a protective vinyl chloride layer with the added feature of having excellent rust-inhibiting characteristics by reason of the presence of the small amount of sodium nitrite dispersed therein as colloidal particles in an amount insufficient to have any deleterious effect on the film formed of the resinous material.

Example II

Coating composition:
- 210 parts by weight methyl ethyl ketone
- 35 parts by weight methyl isobutyl ketone
- 101 parts by weight xylene
- 38.4 parts by weight methanol
- 1.6 parts by weight sodium nitrite
- 60 parts by weight polyvinyl chloride resin (Geon 400 x 110; B. F. Goodrich Company)
- 24 parts by weight dioctylphthalate plasticizer Procedure: The materials in the above composition are incorporated as previously described in Example I to provide a coating composition in which the film formed or in which the solids therein contain about 1.9% by weight of sodium nitrite, which is more than adequate to protect a metal surface coated with the material from corrosion or rusting.

Example III

Coating composition:
- 210 parts by weight methyl ethyl ketone
- 35 parts by weight methyl isobutyl ketone
- 101 parts by weight xylene
- 1.73 parts by weight methanol
- 0.072 part by weight sodium nitrite
- 60 parts by weight polyvinyl chloride
- 24 parts by weight dioctylphthalate plasticizer Procedure: The above composition formulated in the manner described in accordance with the teaching of Example I contains about 0.085% by weight sodium nitrite which has been found adequate to prevent rusting and corrosion of metal surfaces.

The amount of sodium nitrite found effective to prevent rusting and corrosion when formulated into a coating composition in the manner described ranges from 0.05% by weight to 2.0% by weight. Excellent results have been secured with coating compositions containing as little as 0.05% and while excellent results can also be obtained in compositions containing more than 2.0% by weight, the increase in corrosion resistance or rust resistance is not compensated by the increased cost of the sodium nitrite nor the effect of the increased amounts of sodium nitrite upon the characteristics of the coating composition and film that is formed thereon. The sodium nitrite may be substituted in the foregoing examples by potassium nitrite, ammonium nitrite, or other organic nitrites in substantially equivalent amounts. Sodium nitrite is soluble in methanol to the extent of about 4% by weight at room temperature. Thus it is possible to incorporate the desired amounts of sodium nitrite by the use of proportional amounts of sodium nitrite in solution in methanol alcohol. Instead of methanol alcohol, use can be made of ethanol alcohol, preferably with additions of small amounts of water to increase the solubility of the nitrite. Instead of the alcohols, use may be made of other solvents in which the nitrites are soluble in the desired concentrations and which can be used to form compatible systems with other solvents for the film-forming resins.

Instead of the system of methyl ethyl ketone, methyl isobutyl ketone and xylene, the solvent systems forming the main solvent phase of the composition may be selected of such other materials as the ketones, hydrocarbons, chlorinated solvents, ethers, esters, and nitrated solvents in which the solvent system is selected for use with particular film-forming resinous materials to effect solution, and in which the solvent system is selected for compatibility with the solvent phase in which the nitrite is dissolved.

Instead of polyvinyl chloride, use may be made of other resinous film-forming materials such as vinyl chloride-vinyl acetate copolymers, vinylidene chloride-vinyl chloride polymers, polyvinylacetate, polyvinyl acetal, polystyrene, polyamids, polychloroprene, chlorinated rubber and other natural or synthetic elastomers, polyacrylates, polyesters, cellulose ethers and esters, such as cellulose acetate, nitro-cellulose, ethylene cellulose and the like, epoxy resins, phenol-formaldehyde resins, isocyanate resins and the like.

The following will represent a nitrite system in combination with a film-forming resin other than polyvinyl chloride as indicated above.

Example IV

Coating composition:
- 32 parts by weight ethyl cellulose
- 30 parts by weight chlorinated biphenyl resin (Aroclor 5460; Monsanto Chemical Company)
- 2 parts by weight polyphenyl resin (Aroclor 1242; Monsanto Chemical Company)
- 22 parts by weight titanium dioxide pigment
- 300 parts by weight toluene
- 75 parts by weight ethanol
- 11.6 parts by weight methanol
- 0.45 part by weight sodium nitrite Procedure: A solution of sodium nitrite in methanol is added with mixing to a mixture of the toluene and ethanol. The nitrite is not soluble in the solvent system that is formed, with the result that it is precipitated as fine colloidal particles which become uniformly distributed throughout the solvent system. The remaining constituents are added and the mixture is milled to dissolve the ethyl cellulose and resins and to disperse the titanium dioxide pigment.

A coating applied with this composition provides excellent protection to prevent rusting or corrosion of the steel or iron surfaces onto which the coating is applied.

Instead of the nitrites, the described concepts may be employed for the desired dispersion of particles of other compounds for resisting corrosion and rusting, such as the dichromates, phosphates and the like, alone or in combination with each other. Such other compounds for resisting corrosion may be employed in amounts considerably less than heretofore provided in systems of the type described, when such compounds are formulated into the composition by the techniques of this invention.

The following will illustrate the practice of this invention with a representative corrosion-inhibiting compound.

Example V

Coating composition:
- 0.1 part by weight sodium carbonate
- 0.04 part by weight trisodium phosphate
- 0.11 part by weight potassium dichromate
- 0.75 part by weight water
- 28 parts by weight ethanol
- 30 parts by weight toluene
- 60 parts by weight polyvinyl chloride resin (Geon 400 x 110; B. F. Goodrich Company)
- 188 parts by weight methyl ethyl ketone
- 24 parts by weight dioctylphthalate Procedure: A slurry is formed of the polyvinyl chloride resin in the toluene and ethanol. 1–10 parts by weight of the mixture of soda ash, trisodium phosphate, potassium dichromate in solution with water in the ratio described, is added to the slurry of polyvinyl chloride wherein the salts precipitate as fine colloidal particles. The methyl ethyl ketone and dioctylphthalate are added to the slurry with agitation to dissolve the polyvinyl chloride resin and form a composition which when applied to form a thin coating on a metal surface, is able to provide desired protection of the surface while preventing corrosion and rusting.

The following will illustrate the practice of this invention in the preparation of a strip film for the protection of metal parts in storage or shipment.

Example VI

Coating composition:
- 245 parts by weight methyl ethyl ketone
- 100 parts by weight cyclohexanone
- 6.25 parts by weight methanol
- 0.25 parts by weight sodium nitrite
- 90 parts by weight polyvinyl chloride resin (Geon 400 x 74)
- 10 parts by weight polyvinyl chloride resin (Geon 400 x 110)
- 44 parts by weight dioctylphthalate
- 8 parts by weight aluminum powder (325 mesh)

Procedure: The sodium nitrite is dissolved in the methanol and the solution is added with mixing to the methyl ethyl ketone and cyclohexanone to form a stable system which is incapable of retaining the sodium nitrite to that the latter precipitates as colloidal particles. The polyvinyl chloride resins are added with mixing to form a solution or gel of the resinous material. The plasticizer is then added, followed by the pigment to produce a composition which can be sprayed onto metal surfaces to form a dried film which can be stripped from the metal. The sodium nitrite present in dilute concentration and as fine colloidal particles uniformly distributed throughout the film, functions to protect the surfaces of the metal against rusting and corrosion.

It will be understood that the basic concepts described can be embodied in various systems of film-forming resinous materials and compounds for preventing corrosion and rusting to provide a protective coating for metal, and that changes may be made in the details with respect to the materials of which the composition is formed, their order of addition, their method of formulation and application, without departing from the spirit of the invention, especially as defined in the following claims.

I claim:
1. In the method of preparing a coating composition of a film-forming resinous material with a corrosion-inhibiting compound dispersed therein, the steps of dissolving the corrosion-inhibiting compound in a solvent, mixing the resultant solution with another compatible solvent to form a stable solvent system which system is a solvent for the film-forming resinous material but not for the corrosion-inhibiting compound whereby a colloidal dispersion is formed in the composite solvent system, and dissolving the film-forming resinous material in the composite solvent system to form the coating composition containing the dispersed corrosion-inhibiting compound.

2. In the method of preparing a coating composition of a film-forming resinous material with a corrosion-inhibiting compound dispersed therein, the steps of dissolving the corrosion-inhibiting compound in a first solvent, mixing the resultant solution with a second solvent with which the first solvent is compatible to form a stable solvent system in which the film-forming resinous material is soluble but in which the corrosion-inhibiting compound is insoluble whereby the latter precipitates in situ as a nascent dispersoid, and dissolving the film-forming material in the composite solvent system to form the coating composition containing the dispersed corrosion-inhibiting compound.

3. The method as claimed in claim 1 in which the corrosion-inhibiting compound comprises a nitrite.

4. The method as claimed in claim 1 in which the corrosion-inhibiting compound comprises sodium nitrite.

5. The method as claimed in claim 3 in which the nitrite is present in an amount ranging from 0.05 to 2.0% by weight of the solids in the coating composition.

6. The method as claimed in claim 3 in which the first solvent for the corrosion-inhibiting compound is a primary aliphatic alcohol.

7. In the method of preparing a coating composition of a film-forming resinous material with a corrosion-inhibiting compound dispersed therein, the steps of dissolving sodium nitrite in methanol, mixing the resultant solution with a solvent containing methylethyl ketone, methylisobutyl ketone, and xylene such that the sodium nitrite precipitates in situ to form a nascent dispersoid, and then dissolving a polyvinyl chloride resin in the composite solvent system to form the coating composition containing the dispersed corrosion-inhibiting compound.

8. The method as claimed in claim 6 in which the solvent for the corrosion-inhibiting compound is methyl alcohol.

9. The method as claimed in claim 1 which includes the additional steps of adding pigments to the composition and grinding the pigments into the composition.

10. The method as claimed in claim 1 in which the film-forming resinous material is a polyvinyl chloride.

11. The method as claimed in claim 1 in which the film-forming material is a polyvinyl chloride and which includes the additional step of adding a dioctylphthalate plasticizer to the solution of the polyvinyl chloride.

References Cited in the file of this patent

UNITED STATES PATENTS 2,676,942    Glass _____ Apr. 27, 1954

FOREIGN PATENTS 121,458    Australia _____ May 30, 1946

OTHER REFERENCES

MacArdle: "The Use of Solvents," pages 41 and 151, D. Van Nostrand Co., New York, New York, 1925.

"Treatise on Pharmacy," Caspari-Kelly-Lea and Febiger, New York, 1926, page 219.

Lewis et al.: "Industrial Chemical of Colloidal and Amorphous Materials," The Macmillan Co., New York (1943), pages 113–114.

Speller: "Corrosion, Causes and Prevention," McGraw-Hill Book Co., New York, published September 1951, page 410.